(12) United States Patent
Chun

(10) Patent No.: US 8,574,749 B2
(45) Date of Patent: Nov. 5, 2013

(54) LITHIUM SECONDARY BATTERY

(75) Inventor: Kwan-Sic Chun, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 808 days.

(21) Appl. No.: 12/691,133

(22) Filed: Jan. 21, 2010

(65) Prior Publication Data

US 2011/0086261 A1  Apr. 14, 2011

Related U.S. Application Data

(60) Provisional application No. 61/251,417, filed on Oct. 14, 2009.

(51) Int. Cl.
*H01M 10/00* (2006.01)
*H01M 10/04* (2006.01)
*H01M 10/052* (2010.01)

(52) U.S. Cl.
USPC .......................................... 429/164; 429/130

(58) Field of Classification Search
USPC ............. 429/53, 40, 130, 51, 94, 163, 174
See application file for complete search history.

(56) References Cited

U.S. PATENT DOCUMENTS

| | | | |
|---|---|---|---|
| 5,882,815 A | 3/1999 | Tagawa | |
| 6,387,561 B1 | 5/2002 | Nemoto et al. | |
| 7,534,522 B2 | 5/2009 | Chang et al. | |
| 7,655,349 B2 | 2/2010 | Kim et al. | |
| 2003/0148175 A1 | 8/2003 | Iwanaga et al. | |
| 2006/0024571 A1 | 2/2006 | Kim et al. | |
| 2006/0063063 A1 | 3/2006 | Mori et al. | |
| 2006/0099502 A1* | 5/2006 | Kim et al. | 429/174 |
| 2006/0263673 A1* | 11/2006 | Kim et al. | 429/40 |
| 2006/0275665 A1 | 12/2006 | Hyung et al. | |
| 2007/0166605 A1 | 7/2007 | Meguro et al. | |
| 2007/0269711 A1* | 11/2007 | Meguro et al. | 429/94 |
| 2008/0241646 A1* | 10/2008 | Sawa et al. | 429/94 |
| 2009/0061304 A1* | 3/2009 | Muraoka et al. | 429/163 |
| 2009/0130544 A1 | 5/2009 | Chang et al. | |
| 2009/0226799 A1 | 9/2009 | Yamashita et al. | |

FOREIGN PATENT DOCUMENTS

| | | |
|---|---|---|
| EP | 1717878 A1 | 11/2006 |
| JP | 09-270251 | 10/1997 |
| JP | 2000-164257 A | 6/2000 |
| JP | 2000-195483 | 7/2000 |

(Continued)

OTHER PUBLICATIONS

English Translation of Lee et al. (KR 10-2009-0105544, Published Oct. 7, 2009).*

(Continued)

*Primary Examiner* — Basia Ridley
*Assistant Examiner* — Caitlin Wilmot
(74) *Attorney, Agent, or Firm* — Knobbe Martens Olson & Bear, LLP

(57) ABSTRACT

A lithium secondary battery including: an electrode assembly including a center pin inside of the electrode assembly; a can including the electrode assembly; and a cap assembly coupled to a side of the can. At least one end of the center pin includes a deforming end to deform due to an impact power caused by a collision of the deforming end with an inner surface of the can and/or the cap assembly, preventing the center pin from protruding to an outside of the can and/or the cap assembly. Accordingly, the lithium secondary battery is safer by preventing a center pin from protruding when the cylindrical lithium secondary battery explodes due to an increase in internal pressure.

24 Claims, 11 Drawing Sheets

(56) References Cited

FOREIGN PATENT DOCUMENTS

| | | | |
|---|---|---|---|
| JP | 2003-229177 | A | 8/2003 |
| JP | 2006-120606 | A | 5/2006 |
| JP | 2006-286624 | A | 10/2006 |
| JP | 2006-310301 | A | 11/2006 |
| JP | 2007-214106 | A | 8/2007 |
| JP | 2008-244253 | | 10/2008 |
| JP | 2009-218013 | A | 9/2009 |
| KR | 10-2006-0104333 | | 10/2006 |
| KR | 10-2006-0118958 | A | 11/2006 |
| KR | 10-2009-0105544 | * | 10/2007 |
| KR | 10-2008-0066311 | | 7/2008 |
| KR | 10-20090096349 | | 9/2009 |

OTHER PUBLICATIONS

Official Action issued by the Korean Industrial Property Office dated Jul. 15, 2011 in Korean Patent Application No. 10-2010-0043050, 4 pages.

Extended European Search Report issued by the European Patent Office dated Jan. 27, 2011, 6 pages.

JPO Office Action issued by the Japanese Patent Office dated Jan. 8, 2013 in the examination of Japanese Patent Application No. 2010-230440, 3 pages.

* cited by examiner

LITHIUM SECONDARY BATTERY

CROSS-REFERENCE TO RELATED APPLICATION

This application claims the benefit of U.S. Provisional Application No. 61/251,417, filed Oct. 14, 2009 in the U.S. Patent and Trademark Office, the disclosure of which is incorporated herein by reference.

BACKGROUND

1. Field

Aspects of the present invention relate to a cylindrical lithium secondary battery, and more particularly, to a cylindrical lithium secondary battery including a functional center pin.

2. Description of the Related Art

In general, cylindrical lithium secondary batteries include a cylindrical electrode assembly combined with a center pin, a cylindrical can containing the electrode assembly, an electrolyte that is injected into the can to allow lithium ions to move, and a cap assembly connected to one side of the can to prevent the electrolyte from leaking out and the electrode assembly from being displaced. Such cylindrical lithium secondary batteries have a capacity ranging from 2000 to 4000 mA and, thus, are applied to mobile devices with high power consumption (such as notebook computers, digital cameras, and camcorders). For example, a plurality of cylindrical lithium secondary batteries are connected to each other in series or in parallel and assembled with a protective circuit to form a hard pack having a predetermined shape to be used as a power source for mobile devices.

In addition, the cylindrical lithium secondary battery may be manufactured according to the following process. A negative electrode plate coated with a negative electrode active material, a separator, and a positive electrode plate coated with a positive electrode active material are stacked. One end of the stack is bound to a rod-shaped winding axis, and the stack is wound to have a cylindrical shape. Then, a center pin is assembled with the electrode assembly, and the electrode assembly is inserted into the cylindrical can. An electrolyte is subsequently injected into the cylindrical can, and a cap assembly is coupled to the upper portion of the cylindrical can to manufacture the cylindrical lithium secondary battery.

Meanwhile, such cylindrical lithium secondary batteries include a safety vent that is deformed when the internal pressure increases due to an overcharge, and a circuit board that breaks according to the deformation of the safety vent to interrupt current in order to prevent an explosion and an outbreak of a fire caused by the overcharge. In general, the safety vent and the circuit board constitute a current interrupt device (CID), which is an element of the cap assembly.

SUMMARY

Aspects of the present invention provide a cylindrical lithium secondary battery having excellent safety by preventing a center pin from protruding when the cylindrical lithium secondary battery explodes due to an increase in internal pressure.

According to an aspect of the present invention, there is provided a cylindrical lithium secondary battery including: an electrode assembly having a center pin inside of the electrode assembly; a can including the electrode assembly; and a cap assembly coupled to a side of the can, wherein at least one end of the center pin includes a deforming end to deform due to an impact power caused by a collision of the deforming end with an inner surface of the can and/or the cap assembly, preventing the center pin from protruding to an outside of the can and/or the cap assembly.

According to an aspect of the present invention, the center pin may have a hollow inside in a lengthwise direction of the center pin.

According to an aspect of the present invention, at least one end of the center pin may have a notched end having notches along a lengthwise direction of the center pin.

According to an aspect of the present invention, the at least one end of the center pin may include a tapered shape.

According to an aspect of the present invention, the diameter of at least one end of the center pin may increase along the lengthwise direction of the center pin.

According to an aspect of the present invention, the at least one end of the center pin may have a curved shape along the lengthwise direction of the center pin.

According to an aspect of the present invention, the thickness of the at least one end of the center pin may decrease along the lengthwise direction of the center pin.

According to an aspect of the present invention, at least one end of the center pin may have a slit end split with gaps along the lengthwise direction of the center pin.

According to an aspect of the present invention, the at least one split of the slit end may be bent radially outward.

According to an aspect of the present invention, the at least one split of the tip of the slit end may be bent radially outward in spiral directions.

According to an aspect of the present invention, the at least one split of the split end may be bent radially inward.

According to an aspect of the present invention, the at least one split of the split end may be bent radially inward in spiral directions.

According to an aspect of the present invention, the at least one end of the center pin may have a plurality of bends along the lengthwise direction of the center pin.

According to an aspect of the present invention, the thickness of the at least one split of the slit end of the center pin may decrease along the lengthwise direction of the center pin.

According to an aspect of the present invention, at least one end of the center pin may have a holed end with holes.

According to an aspect of the present invention, the at least one end of the center pin may include a tapered shape.

According to an aspect of the present invention, the diameter of at least one end of the center pin may increase.

According to an aspect of the present invention, the at least one end of the center pin may have a plurality of bends along the lengthwise direction of the center pin.

According to an aspect of the present invention, the thickness of at least one end of the center pin may decrease along the lengthwise direction of the center pin.

According to an aspect of the present invention, the cap assembly may include a safety vent disposed to correspond to one end of the center pin and a circuit board disposed at one side of the safety vent.

According to an aspect of the present invention, the cap assembly may include a sub-disc disposed to correspond to one end of the center pin, a vent welded to the sub-disc, a cap-down maintaining the structure of the sub-disc and the vent, and an insulator disposed between the cap-down and the vent to function as an insulator.

In a lithium secondary battery according to aspects of the present invention, the center pin is fractured and deformed when colliding with the cap assembly and/or the inner surface of the can during the explosion of the lithium secondary battery so as to prevent the center pin from protruding and improve safety of the lithium secondary battery. Furthermore, since the center pin has improved safety using a notched end or slit end without using an additional structure, the manufacturing costs for the cylindrical lithium secondary battery may be reduced.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
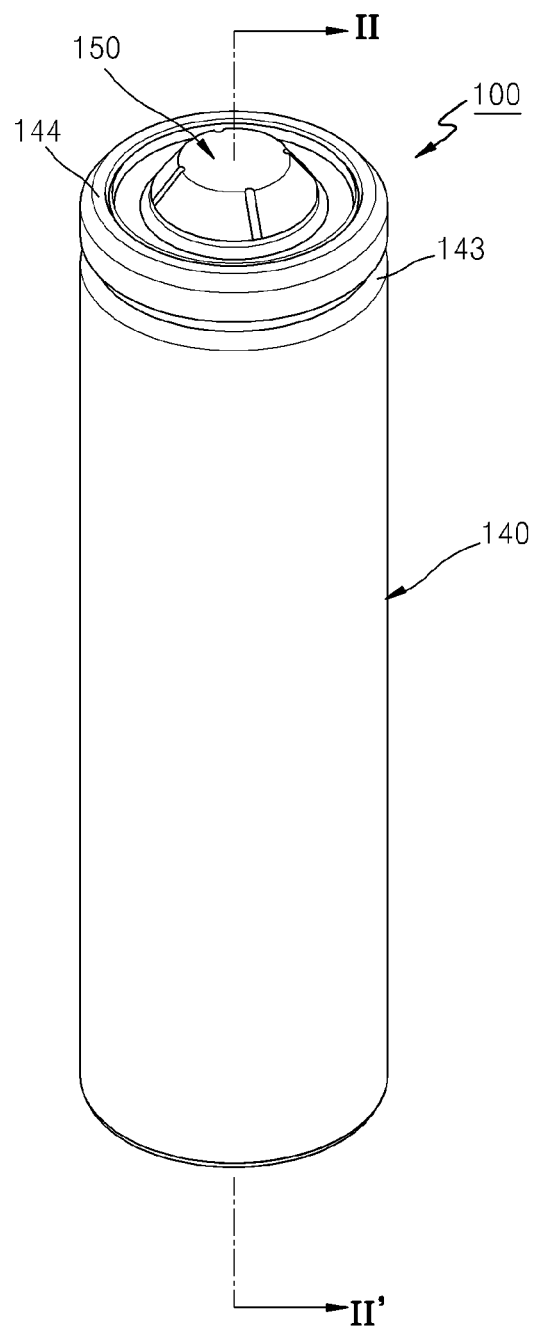
FIG. 1 is a schematic perspective view of a cylindrical lithium secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
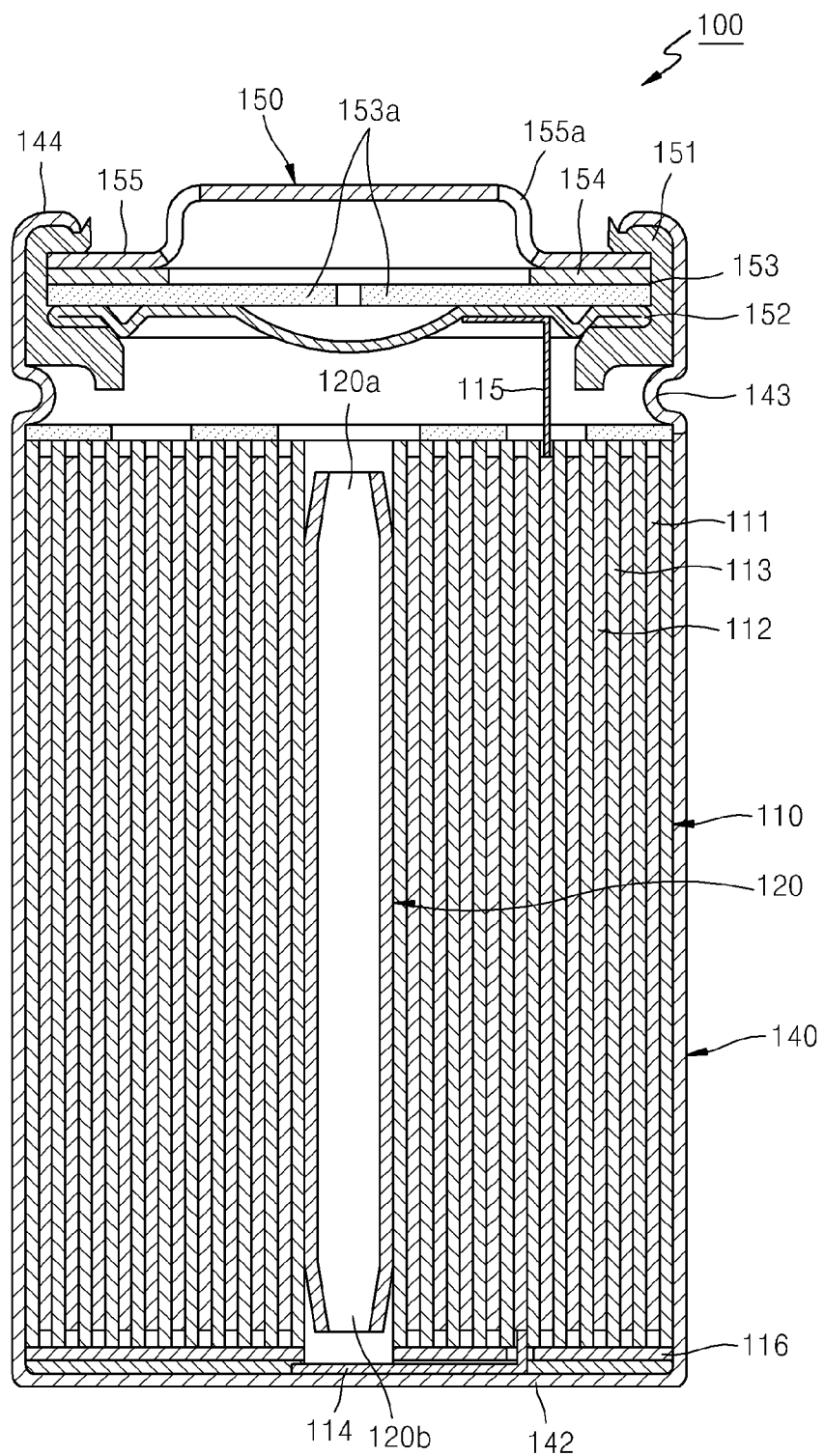
FIG. 2 is a schematic cross-sectional view taken along line II-II' of FIG. 1.
Figure 3:
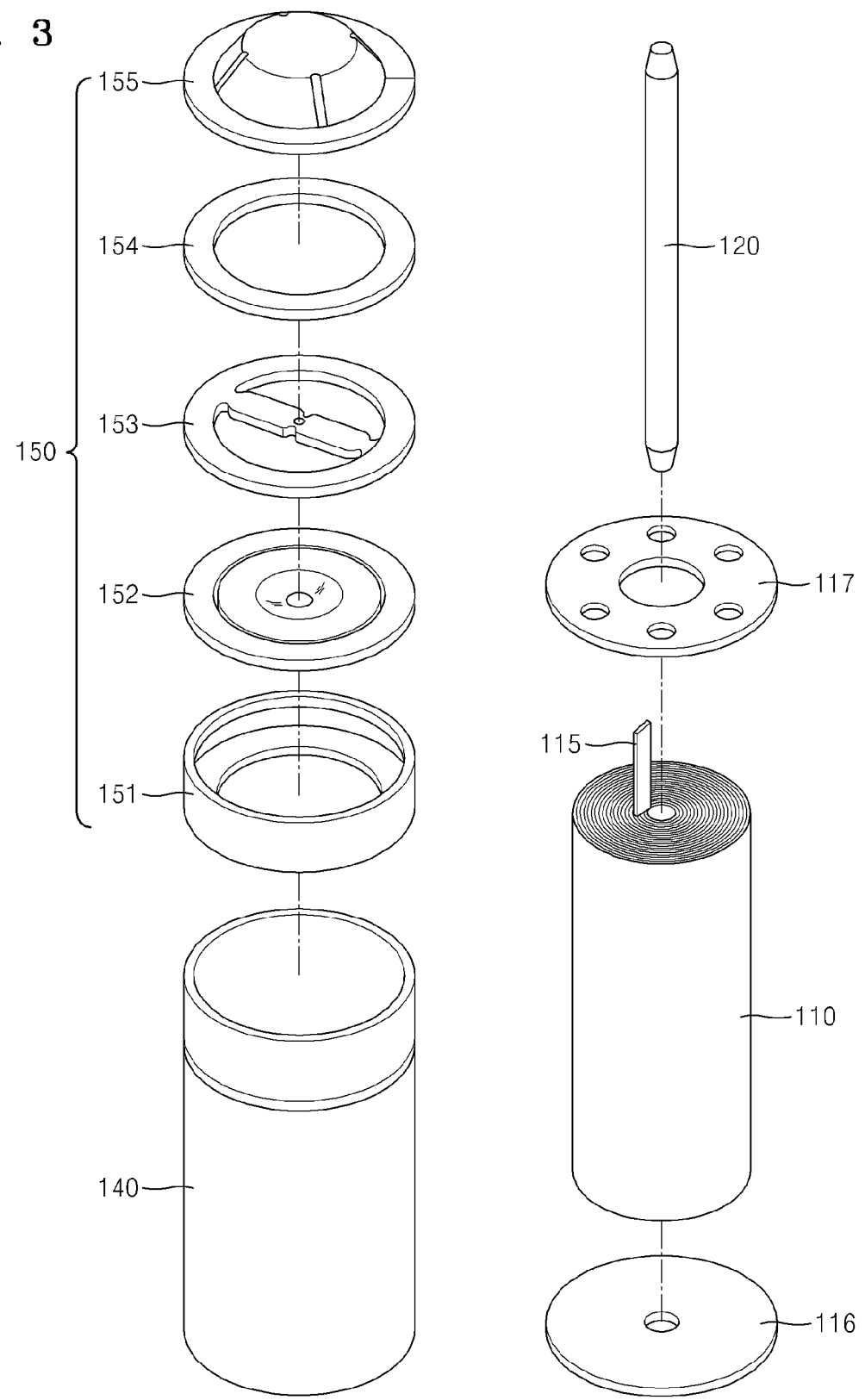
FIG. 3 is a schematic exploded perspective view of the lithium secondary battery shown in FIG. 1.

Referring to FIGS. 1 to 3, a cylindrical lithium secondary battery 100 will now be described. FIG. 1 is a schematic perspective view of the cylindrical lithium secondary battery 100 according to an embodiment of the present invention. FIG. 2 is a schematic cross-sectional view taken along line II-II' of FIG. 1. FIG. 3 is a schematic exploded perspective view of the lithium secondary battery 100 shown in FIG. 1. While aspects of the present invention are described herein in relation to a cylindrical lithium secondary battery 100, it is understood that aspects are not limited to a cylindrical battery and may be applied to any shape of battery. For instance, the lithium battery could have a rectangular, square, oval or other cross-sectional shape, and the invention is not limited to the prismatic shape having the constant cross section as shown.

Referring to FIGS. 1 to 3, the cylindrical lithium secondary battery 100 includes an electrode assembly 110, a center pin 120, a cylindrical can 140, and a cap assembly 150. The electrode assembly 110 includes a negative electrode plate 111, a positive electrode plate 112, and a separator 113. In this regard, the negative electrode plate 111 is coated with a negative electrode active material, such as graphite. The positive electrode plate 112 is coated with a positive electrode active material, such as lithium cobalt oxide (LiCoO2). The separator 113 is disposed between the negative electrode plate 111 and the positive electrode plate to prevent a short circuit and to allow only lithium ions to move therethrough. The negative electrode plate 111, the positive electrode plate 112, and the separator 113 are wound approximately into the shape of a cylinder and are contained in the cylindrical can 140.

The negative electrode plate 111 may be formed of a copper (Cu) foil. The positive electrode plate 112 may be formed of an aluminum (Al) foil. The separator 113 may be formed of polyethylene (PE) or polypropylene (PP). In addition, the negative electrode plate 111 may be welded to a negative electrode tab 114 that protrudes downward by a predetermined distance, and the positive electrode plate 112 may be welded to a positive electrode tab 115 that protrudes upward by a predetermined distance. However, it is understood that aspects of the present invention are not limited thereto. For example, according to other aspects, the negative electrode plate 111 may be welded to a negative electrode tab 114 that protrudes upward by a predetermined distance, and the positive electrode plate 112 may be welded to a positive electrode tab 115 that protrudes downward by a predetermined distance. The negative electrode tab 114 may also be formed of nickel (Ni), and the positive electrode tab 115 may be formed of aluminum (Al). The materials used to form the negative electrode plate 111, the positive electrode plate 112, the separator 113, the negative electrode tab 114, and the positive electrode tab 115 are not limited to those described above, and any materials that are commonly used in the art may be used herein. Meanwhile, the cylindrical can 140 may be formed of steel, stainless steel, aluminum, or an equivalent thereof, though it is understood that the material thereof is not limited thereto.

The center pin 120 is coupled approximately at the center of the electrode assembly 110 to prevent deformation of the electrode assembly 110 during charging/discharging of the cylindrical lithium secondary battery 100. The center pin 120 may be formed of nickel, though it is understood that aspects of the present invention are not limited thereto. For example, the center pin 120 may alternatively be formed of another metal, such as aluminum, or a composite of metals.

Referring to FIG. 3, the cap assembly 150 includes a gasket 151, a safety vent 152, a circuit board 153, a positive temperature coefficient (PTC) 154, and a positive electrode cap 155. The cap assembly 150 may be disposed at one side of the cylindrical can 140. The gasket 151 having a ring shape is disposed at the one side of the cylindrical can 140. In this regard, the insulating gasket 151 may be coupled to the safety vent 152 that is conductive and connected to the positive electrode tab 115. Here, the safety vent 152 deforms or fractures when the internal pressure of the can 140 increases to break the circuit board 153, or exhausts gas out of the cylindrical lithium secondary battery 100. The circuit board 153 is located at one side of the safety vent 152 to be damaged or broken when the safety vent 152 deforms thereby interrupting current. The PTC 154 is located on top of the circuit board 153 to interrupt the current in the case of overcurrent. The positive electrode cap 155 is located at one side of the PTC 154 to apply positive electrode voltage (or negative electrode voltage) to the external device. In addition, the positive electrode cap 155 may include a plurality of through-holes 155a for easy gas exhaustion. The safety vent 152, the circuit board 153, the PTC 154, and the positive electrode cap 155 are located inside of the insulating gasket 151 to prevent the safety vent 152, the circuit board 153, the PTC 154, and the positive electrode cap 155 from being directly short-circuited to the cylindrical can 140. Also, the circuit board 153 has a wiring pattern 153a on a surface thereof that is cut off when the circuit board 153 is damaged or broken.

Figure 4:
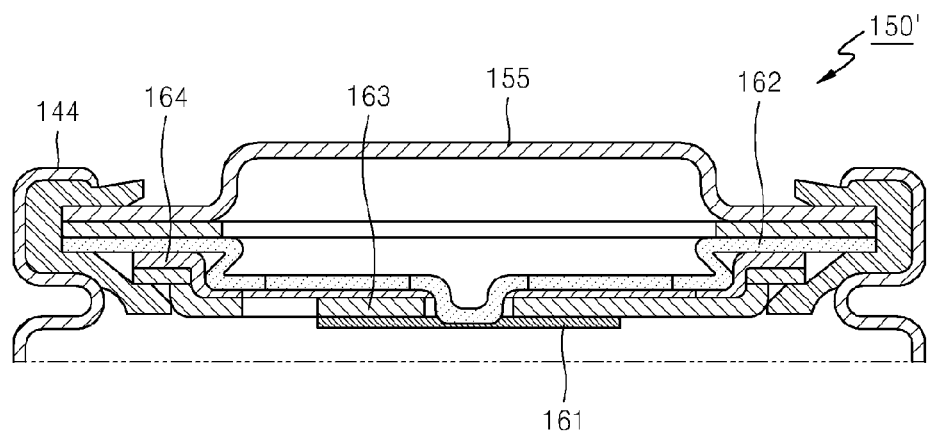
FIG. 4 is a cross-sectional view of a cap assembly according to another embodiment of the present invention.

It is understood that the structure of the cap assembly 150 is not limited as described above. FIG. 4 is a cross-sectional view of a cap assembly 150' according to another embodiment of the present invention. Referring to FIG. 4, the cap assembly 150' includes a sub-disc 161, a vent 162, a cap-down 163, and an insulator 164. Here, the sub-disc 161 is disposed to correspond to an end 120a of the center pin 120, and the vent 162 is welded to the sub-disc 161. In this regard, if the vent 162 is deformed by gas pressure, the sub-disc 161 is detached from the vent 162 so that current is interrupted. The cap-down 163 maintains the structure of the sub-disc 161 and the vent 162. The insulator 164 is disposed between the cap-down 163 and the vent 162 to function as an insulator.

Hereinafter, for ease of description, the cylindrical lithium secondary battery 100 will be described with reference to the cap assembly 150 illustrated in FIGS. 1 to 3. However, it is understood that the function and operation of the center pin 120 in FIGS. 1 to 3 may be applied to the cap assembly 150' of FIG. 4 in the same manner.

Referring to FIG. 2, the cylindrical can 140 has a beading part 143 and a crimping part 144. The beading part 143 is located on the lower portion of the cap assembly 150 and recessed towards the interior of the cylindrical can 140. The crimping part 144 is formed on the upper portion of the cap assembly 150 and bent towards the interior of the cylindrical can 140. The beading part 143 and the crimping part 144 firmly fix and support the cap assembly 150 to the cylindrical can 140, prevent displacement of the cap assembly 150, and prevent leaking out of an electrolyte.

In addition, the cylindrical can 140 has an electrolyte (not shown) injected therein to enable lithium ions, which are generated by an electrochemical reaction from the negative electrode plate 111 and the positive electrode plate 112 during the charging/discharging, to move through the electrolyte. The electrolyte may be a non-aqueous organic electrolyte, which is a mixture of a lithium salt and a high-purity organic solvent, or a polymer using a high-molecular electrolyte, though it is understood that the type of electrolyte is not limited thereto.

While not required in all aspects, the shown center pin 120 is located at the center of the electrode assembly 110. The center pin 120 may have a hollow inside in a lengthwise direction, as shown. However, the structure of the center pin 120 is not limited thereto. For example, the center pin 120 may have a filled inside.

Meanwhile, secondary batteries 100 may explode due to various reasons. For example, if the cylindrical lithium secondary battery 100 is overcharged, the electrolyte is evaporated from the upper portion of the electrode assembly 110 so that the electrode assembly 110 increases the resistance gradually. Then, the electrode assembly 110 starts to deform from the central region thereof so that lithium is precipitated. In addition, as the resistance of the upper portion of the electrode assembly 110 increases, heat is generated to increase the temperature of the cylindrical lithium secondary battery 100. In such a state, the internal pressure is rapidly increased by cyclohexyl benzene (CHB) and biphenyl (BP) (electrolyte additives) that are generally decomposed to generate gas when the battery 100 is overcharged. Thus, the cylindrical lithium secondary battery 100 may explode. As such, if the cylindrical lithium secondary battery 100 explodes, the center pin 120 may penetrate the cap assembly 150 and protrude from the cap assembly 150. If the center pin 120 protrudes from the cap assembly 150 due to the explosion of the cylindrical lithium secondary battery 100, the cylindrical lithium secondary battery 100 may have a serious safety problem. Accordingly, at least one end 120a and 120b of the center pin 120 may be designed to be deformed by the collision with the inner surface of the can 140 or the cap assembly 150 to buffer the impact power of the center pin 120, thereby preventing the protrusion of the center pin 120 from the cap assembly 150 and a breach of the battery 100.

Figure 5A:
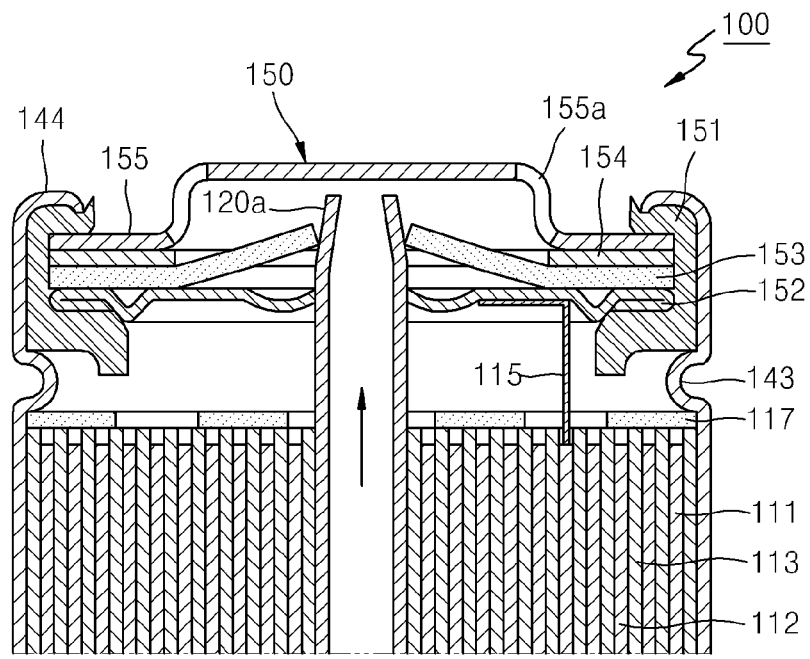
FIGS. 5A and 5B are partial cross-sectional views of a cylindrical lithium secondary battery according to an embodiment of the present invention illustrating a center pin that is deformed by a collision with a positive electrode cap due to an explosion of the lithium secondary battery.
Figure 5B:
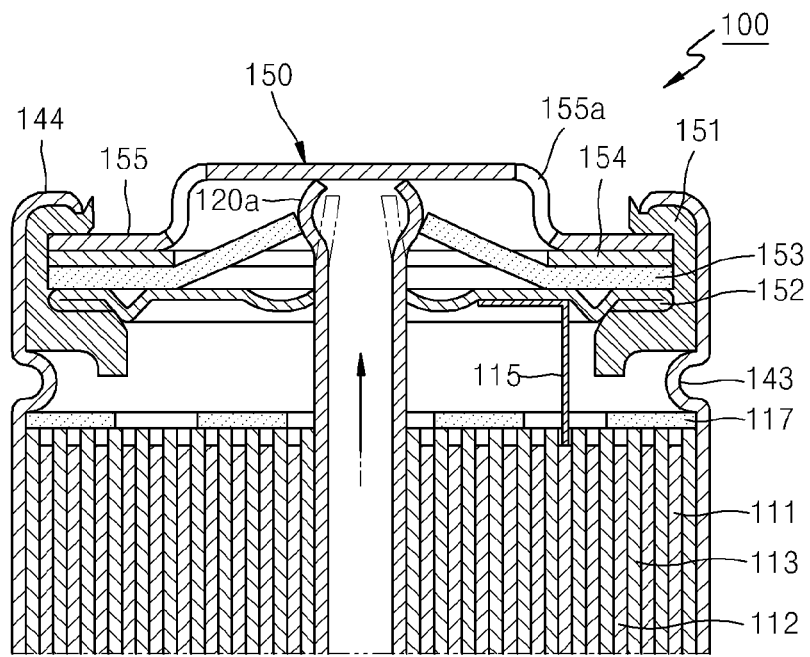

Referring to FIGS. 5A and 5B, the collision between the center pin 120 and the cap assembly 150 will now be described. FIG. 5B is a partial cross-sectional view of the lithium secondary battery according to an embodiment of the present invention illustrating a center pin 120 that is deformed by a collision with the positive electrode cap 155 caused by an explosion of the lithium secondary battery 100. When the center pin 120 is displaced by the explosion, as shown in FIG. 5A, the center pin 120 collides with the safety vent 152, and penetrates the safety vent 152 to deform the safety vent 152. If the safety vent 152 is deformed by the internal pressure caused by, for example, gas, the circuit board 153 disposed at one side of the safety vent 152 is damaged to interrupt the current. As such, the wiring pattern disposed on the circuit board 153 is cut off to interrupt the current flow, thereby functioning as a safety device. When the safety vent 152 is deformed by the collision of the end 120a of the center pin 120 with the safety vent 152, the mechanical force of the center pin 120 in addition to the increased internal pressure directly apply to the safety vent 152. Thus, the safety vent 152 and the circuit board 153 may be seriously deformed, thereby improving safety. Then, the center pin 120 collides with the positive electrode cap 155 of the cap assembly 150, as shown in FIG. 5B. In this regard, the one end of the center pin 120 is easily deformed as shown in FIG. 5B to absorb the impact power when the center pin 120 collides with the positive electrode cap 155, thereby preventing the center pin 120 from protruding.

For convenience of explanation, hereinafter, the collision between the center pin 120 and the positive electrode cap 155 will be described as a collision between the center pin 120 and other elements. However, the collision between the center pin 120 and other elements due to the explosion of the center pin 120 is not limited thereto. For example, the center pin 120 may also collide with a bottom surface 142 of the can 140 as well as, or as opposed to, the positive electrode cap 155.

The end 120a and/or 120b of the center pin 120 may have various structures to be deformed by the collision to buffer the impact power. For example, the end 120a and/or 120b of the center pin 120 may have a notched end n, a slit end g, a holed end h, or any combination thereof. The center pin 120 having a notched end n will be described with reference to FIGS. 6A to 6E, 7A to 7E, and 8, the center pin 120 having a slit end g will be described with reference to FIGS. 9A to 9E, 10, 11A to 11E, and 12, and the center pin 120 having a holed end h will be described with reference to FIGS. 13A to 13C. The center pin 120 having the combination of the notched end n and the slit end g will be described with reference to FIGS. 14A to 14C, the center pin 120 having the combination of the slit end g and the holed end h will be described with reference to FIGS. 15A to 15C, and the center pin 120 having the combination of the notched end n, the slit end g, and the holed end h will be described with reference to FIG. 16. In this regard, the center pin 120 described above has a hollow inside in the lengthwise direction. However, the structure of the center pin 120 is not limited thereto, and the center pin 120 may have a filled inside. Furthermore, the end of the center pin 120 is not limited to the notched end n, the slit end g, the holed end h, and any combination thereof. That is, the end of the center pin 120 may have various structures in order to buffer the impact power to prevent the center pin 120 from protruding from the cap assembly 150.

Figure 7A:
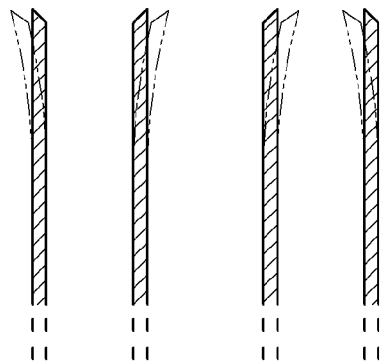
FIGS. 7A to 7E are cross-sectional views of ends of the center pins of FIGS. 6A to 6E having a slope due to the reduced thickness of the end along the lengthwise direction of the center pin.
Figure 7B:
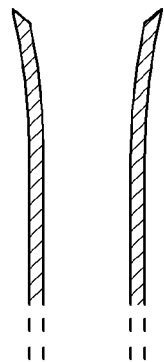
Figure 7C:
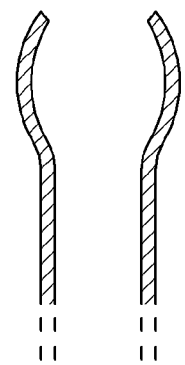
Figure 7D:
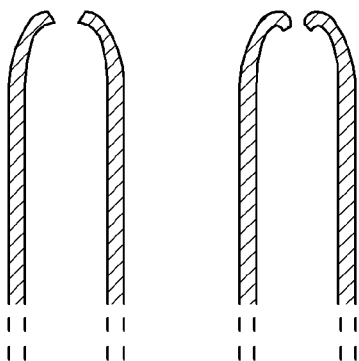
Figure 7E:
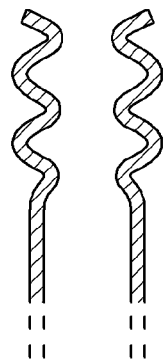
Figure 8:
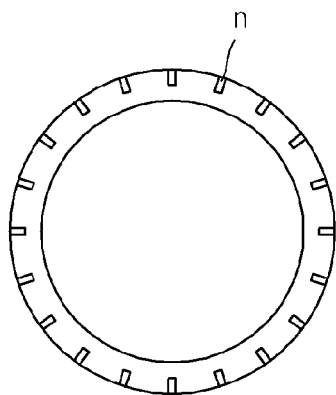
FIG. 8 is a schematic cross-sectional view taken along line VIII-VIII' of FIG. 6A.

The center pin 120 having the notched end n will now be described with reference to FIGS. 6A to 6E, 7A to 7E, and 8. FIGS. 6A to 6E are schematic front views of center pins 120 having a notched end n. FIGS. 7A to 7E are cross-sectional views of ends of the center pins 120 of FIGS. 6A to 6E having a slope due to the reduced thickness of the end along the lengthwise direction of the center pin 120. FIG. 8 is a schematic cross-sectional view taken along line VIII-VIII' of FIG. 6.

Figure 6A:
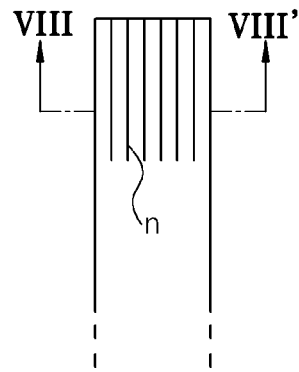
FIGS. 6A to 6E are schematic front views of center pins having a notched end according to embodiments of the present invention.

As shown in FIG. 6A, the center pin 120 has at least one notched end n along the lengthwise direction of the center pin 120. Even though the notched end n is formed in the lengthwise direction of the center pin 120, the shape of the notched end n is not limited thereto. For example, the notched end n of the center pin 120 may have slanted notches or zigzagged notches. In this regard, the diameter of the center pin 120 is constant. Here, the end of the center pin 120 may be sharpened such that the center pin 120 has a slope due to the reduced thickness of the end of the center pin 120 along the lengthwise direction of the center pin 120. Thus, the end of the center pin 120 has a sharp tip and a slope that easily slides radially outward when the end collides with the positive electrode cap 155. Thus, the end of the center pin 120 is easily fractured and deformed radially outward when colliding with the positive electrode cap 155. However, it is understood that aspects of the present invention are not limited to such a shape of the end of the center pin 120. For example, as shown in FIG. 7A, the end of the center pin 120 may also have a slope that easily slides radially inward when the end collides with the positive electrode cap 155. Thus, the end of the center pin 120 is easily fractured and deformed radially inward when colliding with the positive electrode cap 155. Furthermore, the end of the center pin 120 may also have a cross-section without a slope.

Referring to FIG. 8, the notched end n has notches in the outer surface of the center pin 120. However, the notched end n is not limited thereto. The notched end n may also have notches in the inner surface of the center pin 120 so as to be easily fractured and deformed when colliding with the positive electrode cap 155 to buffer the impact power applied to the center pin 120. The degree of deformation of the center pin 120 when colliding with positive electrode cap 155 may be controlled by regulating the depth of the notches of the notched end n. In addition, the bottom of the notch of the notched end n may be sharp or flat.

Figure 6B:
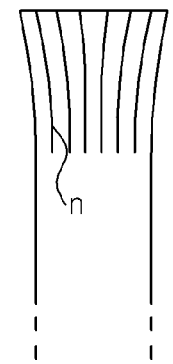

As a modified example of FIG. 6A, FIG. 6B illustrates the end of the center pin 120 that is formed such that the diameter of the center pin 120 increases along the lengthwise direction of the center pin 120. As such, when the diameter of the center pin 120 increases along the lengthwise direction of the center pin 120, the end of the center pin 120 may be fractured and deformed radially outward when the center pin 120 collides with the positive electrode cap 155. FIG. 7B is a cross-sectional view of the center pin 120 shown in FIG. 6B. If the notched end n of the center pin 120 has a slope that easily slides radially outward when the notched end n collides with the positive electrode cap 155, as shown in FIG. 7B, the notched end n of the center pin 120 may be more easily deformed radially outward when colliding with the positive electrode cap 155.

Figure 6C:
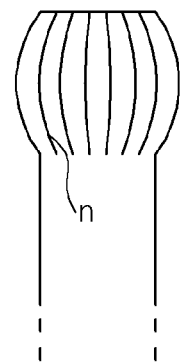

As a modified example of FIG. 6A, FIG. 6C illustrates the notched end n of the center pin 120 that has a curved shape along the lengthwise direction of the center pin 120. It is understood that the curved shaped of the notched end n is not limited to the shape shown in FIG. 6C in which the center of the notched end n is swollen. That is, the notched end n may have various curved shapes. FIG. 7C is a cross-sectional view of the center pin 120 shown in FIG. 6C. Due to the curved shape of the notched end n of the center pin 120 as described above, the impact power is scattered in the circumferential direction of the center pin 120 in addition to the lengthwise direction of the center pin 120 when the center pin 120 collides with the positive electrode cap 155, and is thus buffered.

Figure 6D:
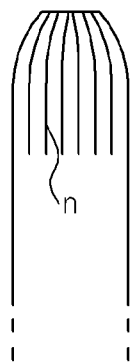

As a modified example of FIG. 6A, FIG. 6D illustrates the notched end n of the center pin 120 that has a tapered shape along the lengthwise direction of the center pin 120 so that the center pin 120 is easily fractured and deformed to buffer the impact power when colliding with the positive electrode cap 155. As described above, when the notched end n of the center pin 120 has a tapered shape in which the diameter of the center pin 120 decreases along the lengthwise direction of the center pin 120, the notched end n of the center pin 120 may be fractured and deformed radially inward when the center pin 120 collides with the positive electrode cap 155. FIG. 7D is a cross-sectional view of the center pin 120 shown in FIG. 6D. If the notched end n of the center pin 120 has a slope that easily slides radially inward when the notched end n collides with the positive electrode cap 155, the notched end n may be more easily deformed radially inward when the center pin 120 collides with the positive electrode cap 155. Alternatively, the notched end n of the center pin 120 may more elastically contact the positive electrode cap 155 during the collision therebetween by bending the notched end n inward.

Figure 6E:
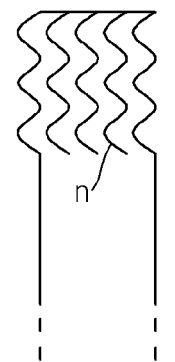

As a modified example of FIG. 6A, FIG. 6E illustrates the notched end n of the center pin 120 that has a plurality of bends along the lengthwise direction of the center pin 120. FIG. 7E is a cross-sectional view of the center pin 120 shown in FIG. 6E. The center pin 120 with the plurality of bends along the lengthwise direction thereof may be elastically fractured and deformed when colliding with the positive electrode cap 155 due to the plurality of bends.

Figure 10:
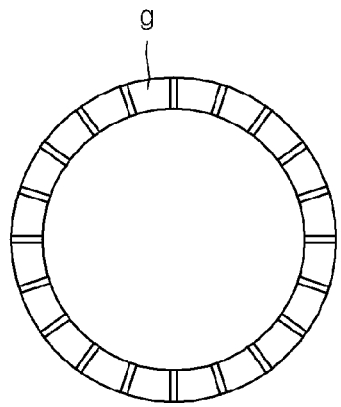
FIG. 10 is a schematic cross-sectional view taken along line X-X' of FIG. 9.

Hereinafter, the center pin 120 having the slit end g will be described with reference to FIGS. 9A to 9E, 10, 11A to 11E, and 12. FIGS. 9A to 9E are schematic front views of center pins having a slit end g. FIG. 10 is a schematic cross-sectional view taken along line X-X' of FIG. 9. FIGS. 11A to 11E are schematic perspective views of FIGS. 9A to 9E, respectively.

Figure 12:
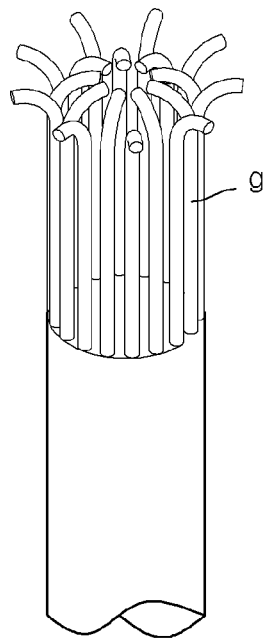
FIG. 12 is a schematic perspective view of a slit end, at least one split of which is bent radially outward according to an embodiment of the present invention.

FIG. 12 is a schematic perspective view of the slit end g, at least one split of which is curved radially outward.

Figure 9A:
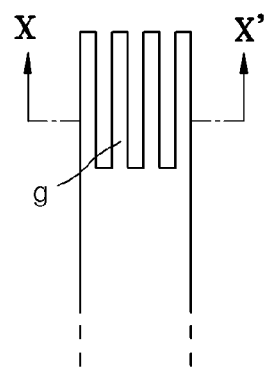
FIGS. 9A to 9E are schematic front views of center pins having a slit end according to embodiments of the present invention.
Figure 11A:
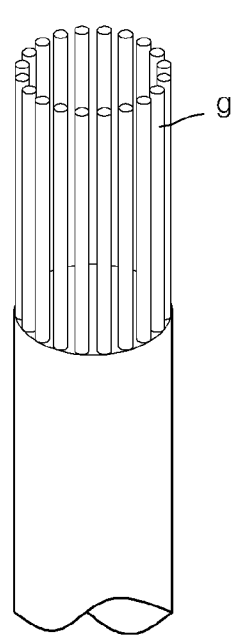
FIGS. 11A to 11E are schematic perspective views of FIGS. 9A to 9E, respectively.

Referring to FIG. 9A, the center pin 120 has a slit end g (i.e., a split) that is split with gaps along the lengthwise direction of the center pin 120. In this regard, the center pin 120 may have a slanted slit end g that is split by slits with gaps. Furthermore, the slit end g of FIG. 9A may have a slope at the tip thereof. FIG. 10 illustrates a cross-section of the center pin 120 having the slit end g that is split by slits with gaps. FIG. 11A is a schematic perspective view of the center pin 120 shown in FIG. 9A.

Figure 9B:
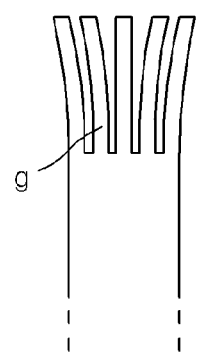
Figure 11B:
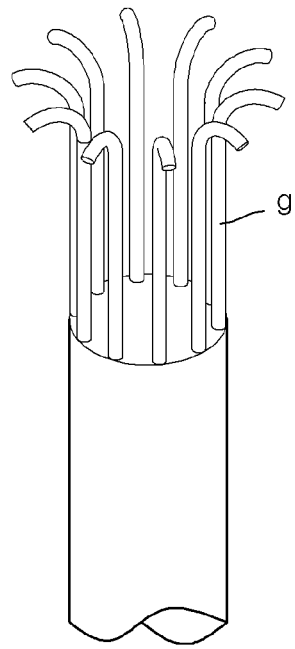
Figure 11C:
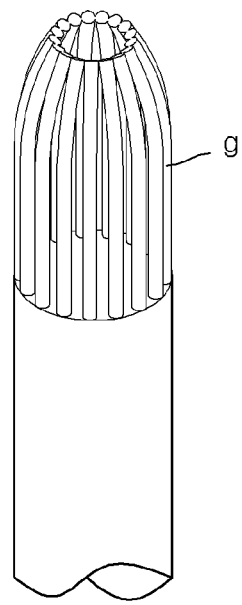

As a modified example of FIG. 9A, FIG. 9B illustrates the slit end g of the center pin 120 that has a plurality of slits along the lengthwise direction of the center pin 120 where the tip of at least one portion of the slit end g is formed radially outward. FIG. 11B is a schematic perspective view of the center pin 120 shown in FIG. 9B. In this regard, the slit end g of FIG. 9B may have a slope facing the center at the tip thereof, as shown in FIG. 7B. Since the tip of the at least one portion of the slit end g is formed radially outward, the slit end g is easily deformed when the center pin 120 collides with the positive electrode cap 155 to buffer the impact power. Here, the slit end g is deformed radially outward when the center pin 120 collides with the positive electrode cap 155.

Figure 9C:
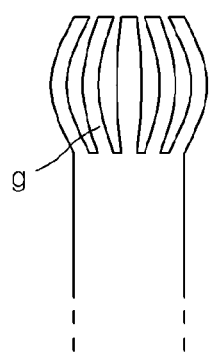

As a modified example of FIG. 9A, FIG. 9C illustrates the slit end g of the center pin 120 that has a curved shape with a plurality of slits formed along the lengthwise direction of the center pin 120. In this regard, the slit end g of the center pin 120 shown in FIG. 9C may have a curved shape, as shown in FIG. 7C. Due to the curved shape of the slit end g of the center pin 120 as described above, the impact power is scattered in the circumferential direction of the center pin 120 in addition to the lengthwise direction of the center pin 120 when the center pin 120 collides with the positive electrode cap 155, and is thus buffered.

Figure 9D:
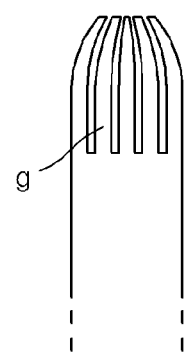
Figure 11D:
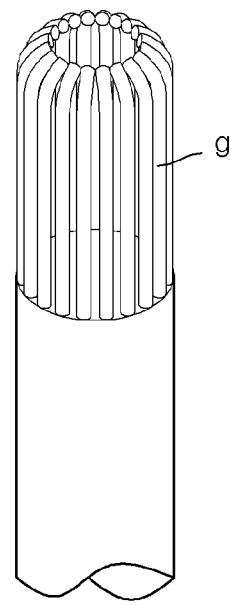

As a modified example of FIG. 9A, FIG. 9D illustrates the center pin 120 that has a slit end g that is split along the lengthwise direction of the center pin 120 with slits where at least one split of the slit end g is formed radially inward. FIG. 11D is a schematic perspective view of the center pin 120 shown in FIG. 9D. Here, the slit end g of the center pin 120 of FIG. 9D has a slope that easily slides radially inward when the slit end g collides with the positive electrode cap 155, as shown in FIG. 7D. Alternatively, the slit end g may be bent inward so that the slit end g may more elastically contact the positive electrode cap 155 during the collision therebetween. Since the at least one split of the slit end g is formed radially inward, the slit end g is easily deformed to buffer the impact power when the center pin 120 collides with the positive electrode cap 155. Here, the slit end g may be deformed radially inward when the center pin 120 collides with the positive electrode cap 155.

Figure 9E:
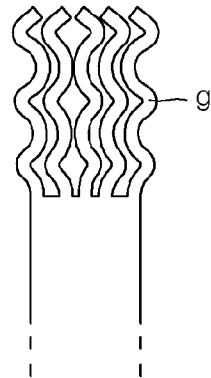
Figure 11E:
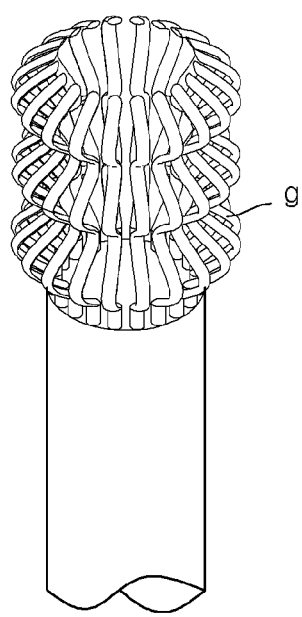

As a modified example of FIG. 9A, FIG. 9E illustrates the slit end g of the center pin 120 that has a plurality of splits along the lengthwise direction of the center pin 120 where the slit end g of the center pin 120 has a plurality of bends along the lengthwise direction of the center pin 120, as shown in FIG. 7E. FIG. 11E is a schematic perspective view of the center pin 120 shown in FIG. 9E. In this case, the center pin 120 may be elastically fractured and deformed when colliding with the positive electrode cap 155 due to the plurality of bends.

It is understood that aspects of the present invention are not limited to the various shapes of the slit end g of the center pin 120 as described above with reference to FIGS. 9A to 9E. For example, the tip of the slit end g may be bent radially outward or inward. As a modified example of FIG. 9A, FIG. 12 illustrates the slit end g of the center pin 120 that has a plurality of slits along the lengthwise direction of the center pin 120 such that some splits of the slit end g are bent radially inward, and the other splits of the slit end g are bent radially outward. When the center pin 120 collides with the positive electrode cap 155 due to the explosion of the cylindrical lithium secondary battery, the center pin 120 may be easily fractured or deformed by modifying the direction and shape of the slit end g. The center pin 120 may be designed not to penetrate and protrude the positive electrode cap 155.

Figure 13A:
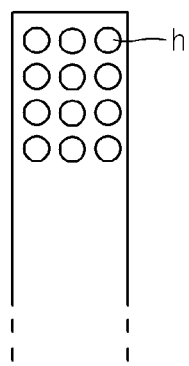
FIGS. 13A to 13C are front views of center pins having a holed end according to embodiments of the present invention.
Figure 13B:
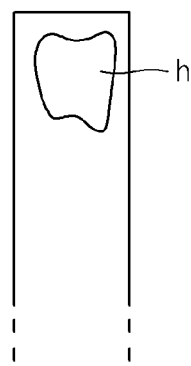
Figure 13C:
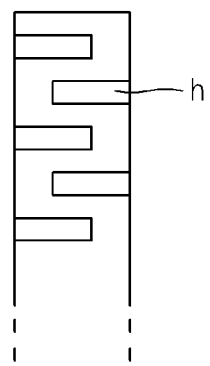

The center pin 120 having the holed end h will now be described with reference to FIGS. 13A to 13C. FIGS. 13A to 13C are front views of center pins 120 having a holed end h. Referring to FIGS. 13A to 13C, at least one end of the center pin 120 may have a holed end h with holes so that the center pin 120 is easily fractured and deformed to buffer the impact power when the center pin 120 collides with the positive electrode cap 155. FIG. 13A illustrates a center pin 120 having a holed end h with a predetermined pattern of a plurality of holes. FIG. 13B illustrates a center pin 120 having a holed end h with a single hole such that the center pin 120 is easily fractured. FIG. 13C illustrates a center pin 120 having a holed end h with holes that are alternately formed.

Although not shown herein, the holed end h of the center pin 120 may have a tapered shape so that the center pin 120 is easily fractured and deformed to buffer the impact power when colliding with the positive electrode cap 155. However, it is understood that aspects of the present invention are not limited thereto. For example, alternatively, the holed end h of the center pin 120 may be formed such that the diameter of the center pin 120 increases along the lengthwise direction of the center pin 120. Furthermore, the holed end h of the center pin 120 may have a curved shape along the lengthwise direction of the center pin 120 so that the center pin 120 is easily fractured and deformed to buffer the impact power when colliding with the positive electrode cap 155. Also, the holed end h of the center pin 120 may have a slope due to the reduced thickness of the end of the center pin 120 along the lengthwise direction.

Figure 14A:
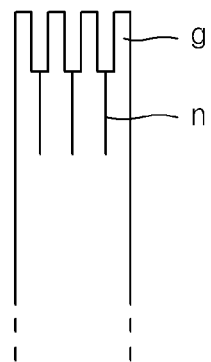
FIGS. 14A to 14C are front views of center pins having a combination of a notched end and a slit end according to embodiments of the present invention.
Figure 14B:
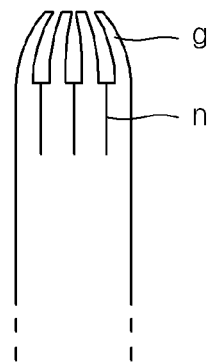
Figure 14C:
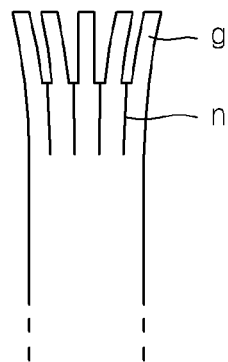

Referring to FIGS. 14A to 14C, a center pin 120 having a combination of a notched end n and a slit end g will be described. FIGS. 14A to 14C are front views of center pins having a combination of a notched end n and a slit end g (i.e., a split). The center pin 120 may have a combination of the notched end n and the slit end g so as to be easily fractured and deformed to buffer the impact power applied to the center pin 120 and prevent the center pin 120 from protruding when colliding with the positive electrode cap 155. For example, FIG. 14A illustrates a combination of the notched end n and the slit end g that is formed straight such that the diameter of the center pin 120 is constant. As a modified example of FIG. 14A, FIG. 14B illustrates a center pin 120 having a slit end g, the tip of which is bent radially inward, and a notched end n disposed at the other end of the tip of the slit end g. Furthermore, as a modified example of FIG. 14A, FIG. 14C illustrates a center pin 120 having a slit end g, the tip of which is bent radially outward, and a notched end n disposed at the other end of the tip of the slit end g.

Figure 15A:
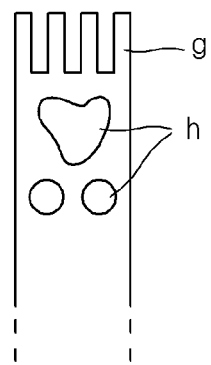
FIGS. 15A to 15C are front views of center pins having a combination of a slit end and a holed end according to embodiments of the present invention.
Figure 15B:
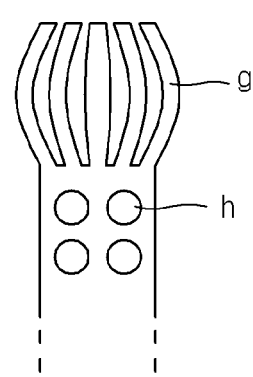
Figure 15C:
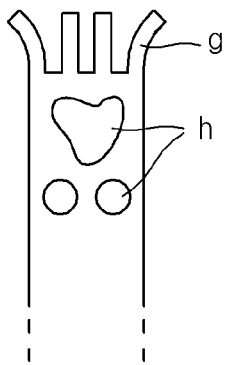

Referring to FIGS. 15A to 15C, a center pin 120 having a combination of a slit end g and a holed end h will now be described. FIGS. 15A to 15C are front views of center pins having a combination of a slit end g and a holed end h. The center pin 120 may have a combination of the slit end g and the holed end h so as to be easily fractured and deformed to buffer the impact power applied to the center pin 120 and prevent the center pin 120 from protruding when colliding with the positive electrode cap 155. For example, FIG. 15A illustrates a combination of the slit end g and the holed end h that is formed straight such that the diameter of the center pin 120 is constant. As a modified example of FIG. 15A, FIG. 15B illustrates the center pin 120 having a slit end g, the tip of which is bent radially inward, and a holed end h disposed at the other end of the tip of the slit end g. Furthermore, as a modified example of FIG. 15A, FIG. 15C illustrates the center pin 120 having a slit end g, the tip of which is bent radially outward, and a holed end h disposed at the other end of the tip of the slit end g.

Figure 16:
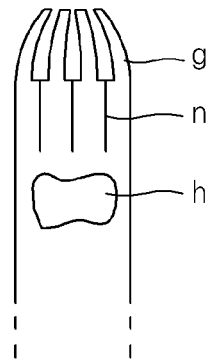
FIG. 16 is a front view of a center pin having a combination of a notched end, a slit end, and a holed end according to an embodiment of the present invention.

Referring to FIG. 16, the center pin 120 having the combination of the notched end n, the slit end g, and the holed end h will now be described. FIG. 16 is a front view of the center pin 120 having a combination of a notched end n, a slit end g, and a holed end h. Due to the notched end n, the slit end g, and the holed end h of the center pin 120, the center pin 120 may be easily fractured and deformed when the center pin 120 collides with the positive electrode cap 155 due to the explosion of the cylindrical lithium secondary battery. As described above, according to aspects of the present invention, the center pin 120 may be designed in various ways to not penetrate and protrude from the positive electrode cap 155.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium secondary battery comprising:
    an electrode assembly comprising a center pin inside of the electrode assembly;
    a can housing the electrode assembly; and
    a cap assembly coupled to a side of the can,
    wherein at least one end of the center pin comprises a deforming end to deform due to an impact power caused by a collision of the deforming end with an inner surface of the can and/or the cap assembly, preventing the center pin from protruding to an outside of the can and/or the cap assembly; and
    wherein the deforming end has a diameter that increases along a direction away from the middle of the center pin,
    wherein the deforming end has a plurality of splits with slits therebetween along a lengthwise direction of the center pin, and at least one split of the plurality of splits is bent radially outward.

2. The lithium secondary battery as claimed in claim 1, wherein the center pin has a hollow inside in a lengthwise direction thereof.

3. The lithium secondary battery as claimed in claim 1, wherein the deforming end has notches along a lengthwise direction of the center pin.

4. The lithium secondary battery as claimed in claim 3, wherein the deforming end has a tapered shape along a direction away from a middle of the center pin.

5. The lithium secondary battery as claimed in claim 3, wherein the deforming end has a curved shape along the lengthwise direction of the center pin.

6. The lithium secondary battery as claimed in claim 3, wherein the notches are provided on an outer lengthwise surface of the deforming end.

7. The lithium secondary battery as claimed in claim 3, wherein the notches are slanted or zig-zagged.

8. The lithium secondary battery as claimed in claim 3, wherein the deforming end has at least one hole through an outer lengthwise surface thereof.

9. The lithium secondary battery as claimed in claim 1, wherein at least one split of the plurality of splits is bent radially outward and at least one other split of the plurality of splits is bent radially inward.

10. The lithium secondary battery as claimed in claim 1, wherein the deforming end has a curved shape along the lengthwise direction of the center pin.

11. The lithium secondary battery as claimed in claim 3, wherein the notches are located closer to a middle of the center pin than the slits along a lengthwise direction of the center pin.

12. The lithium secondary battery as claimed in claim 1, wherein the deforming end has at least one hole through an outer lengthwise surface thereof.

13. The lithium secondary battery as claimed in claim 12, wherein the at least one hole is located closer to a middle of the center pin than the slits along a lengthwise direction of the center pin.

14. The lithium secondary battery as claimed in claim 1, wherein the deforming end has a beveled shape.

15. The lithium secondary battery as claimed in claim 1, wherein the can is cylindrical.

16. The lithium secondary battery as claimed in claim 1, wherein the deforming end is provided in a lengthwise direction of the center pin.

17. A lithium secondary battery comprising:
    an electrode assembly comprising a center pin inside of the electrode assembly;
    a can housing the electrode assembly; and
    a cap assembly coupled to a side of the can,
    wherein at least one end of the center pin comprises a deforming end to deform due to an impact power caused by a collision of the deforming end with an inner surface of the can and/or the cap assembly, preventing the center pin from protruding to an outside of the can and/or the cap assembly;
    wherein the deforming end has a plurality of splits with slits therebetween along a lengthwise direction of the center pin, and at least one split of the plurality of splits is bent radially inward.

18. The lithium secondary battery as claimed in claim 17, wherein at least one split of the plurality of splits is bent radially inward and at least one other split of the plurality of splits is bent radially outward.

19. The lithium secondary battery as claimed in claim 17, wherein the deforming end has notches along a lengthwise direction of the center pin.

20. The lithium secondary battery as claimed in claim 19, wherein the notches are located closer to a middle of the center pin than the slits along a lengthwise direction of the center pin.

21. The lithium secondary battery as claimed in claim 19, wherein the notches are provided on an outer lengthwise surface of the deforming end.

22. The lithium secondary battery as claimed in claim 19, wherein the deforming end has at least one hole through an outer lengthwise surface thereof.

23. The lithium secondary battery as claimed in claim 17, wherein the deforming end has at least one hole through an outer lengthwise surface thereof.

24. The lithium secondary battery as claimed in claim 23, wherein the at least one hole is located closer to a middle of the center pin than the slits along a lengthwise direction of the center pin.

* * * * *